United States Patent [19]

Miserlis et al.

[11] 4,089,365
[45] May 16, 1978

[54] METHOD OF PUMP-AROUND COOLING REACTION MASS DURING POLYMERIZATION OF OLEFINS

[75] Inventors: Constantine D. Miserlis, Arlington; Peter J. Lewis, Andover, both of Mass.

[73] Assignee: The Badger Company, Cambridge, Mass.

[21] Appl. No.: 728,153

[22] Filed: Sep. 30, 1976

[51] Int. Cl.² ............................................... B01J 1/00
[52] U.S. Cl. ........................................ 165/1; 23/285; 23/288 E; 23/288 K; 165/DIG. 5; 260/695
[58] Field of Search ................. 165/1, 2, 38, DIG. 5; 23/283, 284, 285, 288 E, 288 K; 260/695

[56] References Cited

U.S. PATENT DOCUMENTS 2,984,657  5/1961  Grundmann et al. ......... 23/288 E X
3,529,940  9/1970  Shima et al. ....................... 23/285 X Primary Examiner—Albert W. Davis, Jr.
Attorney, Agent, or Firm—Sewall P. Bronstein

[57] ABSTRACT

Cooling the highly viscous reaction mass during catalytic polymerization of liquid olefins to polyolefins by pumping it to and from the reactor through the tubes of a heat transfer single pass cooler rather than a heat transfer multi-pass cooler as has been done in the past, increasing the number of the tubes in the single pass cooler as compared to the multi-pass cooler, reducing the diameter of the tubes and increasing the pump capacity. The number of tubes and pump capacity are increased sufficiently and the internal diameters of the tubes are decreased sufficiently so that the heat transfer coefficient of the single pass cooler is between 10 and 20 BTU/ft²hr. ° F.

11 Claims, 3 Drawing Figures

METHOD OF PUMP-AROUND COOLING REACTION MASS DURING POLYMERIZATION OF OLEFINS

THE PROBLEM

In the catalytic liquid phase polymerization of olefins to polyolefins, such as polyethylene, polypropylene, polybutylene, etc. the polymerization reaction is strongly exothermic. Unless the heat generated is removed the temperature of the reaction mass rises above acceptable limits. Accordingly, the reactors are conventionally provided with cooling plate coils which extend through the reactor and which also function as baffles. These coils are cooled with water. However, they are not adequate to prevent reaction temperatures from exceeding acceptable limits. Accordingly, further exothermic heat is removed from the reaction mass by external pump-around cooling which comprises continuously pumping the reaction mass from the reactor through the tubes of an external heat exchanger (cooler) and back to the reactor.

The olefin monomer is polymerized in the reactor in a liquid state and under a positive pressure to retain it in that state. As the polymer is formed it becomes dissolved in the liquid monomer to form a highly viscous reaction mass, the viscosity of which may vary from about 1000 to 15000 centipoises depending on the ratio of polymer to monomer maintained in the reaction mass, which may vary from 10 to 35% by weight.

This very high viscosity of the reaction mass and its nature, i.e., polymer dissolved in liquid monomer, together present the following serious problems in pump-around cooling unique to this reaction system:

1. If the reaction mass is overcooled at any point in the pump-around cooler the polymer freezes and plugs the system.

2. The velocity through the tubes of the external cooler must be high enough to keep the highly viscous mass moving at all times in all parts of the tubes or else overcooling occurs at localized areas within the tubes with resultant freezing. Consequently, there is little room for error in cooler design.

3. Because of the high viscosity of the reaction mass and its perculiar nature, as aforesaid, multi-pass, multi-bank tubular coolers have been used with a limited number of relatively large diameter tubes and relatively low capacity pumps. As is well known in the art, multi-pass (multi-bank) coolers comprise banks of coolers in series each bank having its bundle or cluster of parallel heat transfer tubes mounted in a shell by a pair of tube sheets at opposite ends of the shell with an inlet head at one end of the shell inletting into the inlet ends of the tubes of the cluster and an outlet head at the other end of the shell into which the outlet ends of the tubes exit. In most cases a single baffled outer cooling shell (the coolant flows through the shell side) is used with the bundle or cluster of tubes of each bank located side by side in parallel relation to the others and with a single head at each end of the banks baffled to form an entry head for each bank and an exit head for the next succeeding bank in the series so that the flow from the exit ends of the cluster of tubes of each bank is baffled to turn 180° through the head to the entry ends of the tubes of the next cluster. Fall out of polymer from its liquid monomer occurs at the heads and tube ends which sticks to the surface thereof. This fallout interferes with cooling, reduces velocity, increases pressure drop and eventually fouls the system thereby requiring numerous shut downs to remove the precipitated polymer. This increases power requirements and is costly.

4. The pressure drop across the multi-bank cooler is quite high because of the relatively long total path. Pressure drop is proportional to the total length of travel of the reaction mass through the tubes and hence to the number of passes. Thus, for example, with tube lengths in each bank of 15 feet the drop in pressure across the bank may be 100 psig; with two banks or passes the total pressure drop is 200 psig; and with four passes the pressure drop is 400 psig. This results in relatively high utility cost per pound of product because of the relatively large amount of power required to overcome these cumulative pressure drops.

5. The presence of substantial amounts of water kills or inactivates the polymerization catalyst thereby stopping or killing polymerization in the reactor. Conventional reactors are provided with safety devices to kill the reaction in the reactor in case of a runaway reaction. If the reaction runs away uncontrollable heat and pressure are quickly built up with danger of explosion if the reaction is not killed. The safety devices are designed to dump water into the reactor and thereby kill the reaction in case of a runaway reaction. After the reaction is killed, the water in the system resulting from killing the reaction is removed without shutting down by continuously flowing cold liquid olefin monomer without catalyst through the system until it is dry. It takes from 7 to 10 days of flushing with olefin monomer to dry the system. Accordingly, production is interrupted for 7 to 10 days every time the reaction must be killed, which increases cost substantially. Also, the monomer used to dry the system must be recovered by removing the water therefrom. This is done by distillation. The cost of removing water from such a large volume of monomer is costly.

6. Leakage of reaction mass through the head baffles may occur, particularly in view of the high pressures used.

7. The use of a low capacity pump limits mass flow through the cooler.

BRIEF DESCRIPTION OF THE INVENTION

In accordance with the present invention, the aforesaid problems of fall out of polymer on heat transfer surfaces with its attendant disadvantages, of high pressure drop across the pump around cooler with its attendant disadvantages, of the relatively long time required to dry out the system after the reaction is killed with its attendant disadvantages and of leakage across the head baffles are sharply reduced.

This is achieved by use of an external, single-pass, pump-around tubular cooler, rather than a multi-pass cooler, having an increased number of tubes of smaller diameter, together with a pump of increased capacity.

The number of tubes of the single-pass cooler, the internal tube diameter and the pump capacity are preferably sufficient to achieve a coefficient of heat transfer of between 10–20 BUT/ft$^2$ hr. ° F and a velocity of between 0.3 to 0.7 gallons per minute per tube.

The increased number of tubes in the single-pass cooler varies directly with the polyolefin production capacity of the plant using as a base for calculation between 2000 and 3000 tubes per 15,000,000 pounds per year of polyolefin plant capacity.

The number of tubes is preferably increased to a number equal to about the same total number of tubes in all the banks or passes of the multi-pass cooler.

The length of the tubes is preferably about the same as the length of the tubes in each bank of the multi-pass cooler so that the length of travel of the reaction mass is reduced by a factor equal to the inverse of the number of passes of the multi-pass cooler.

The internal diameter of the tubes is reduced (L/D factor is increased, L being length of tubes and D being internal diameter) to increase velocity and heat transfer coefficient. The internal tube diameter is preferably reduced to between ¼ and ¾, more preferably between ¼ and ⅜, inch.

The pump capacity is increased to also increase velocity and coefficient of heat transfer. Preferably the pump capacity is increased by a factor equal to the number of passes of the multi-pass cooler to thereby substantially increase the mass flowing through the cooler tubes by the same factor.

It has been discovered suprisingly enough that by the use of a single-pass tubular cooler (1) polymer does not drop out at the ends of the tubes and in the exit head and (2) the system can be dried in twenty-four hours, only 1/7 or ⅛ the time required with multi-pass coolers.

Further, the pressure drop is reduced by the inverse of the number of passes of the multi-pass coolers with substantial savings in power, the danger of leakage past the head baffles is eliminated and the mass flowing through the cooler is increased.

DESCRIPTION OF THE DRAWINGS

The advantages of the invention will be further understood by the following drawings and detailed description thereof in which drawings

DETAILED DESCRIPTION OF THE INVENTION

Figure 1:
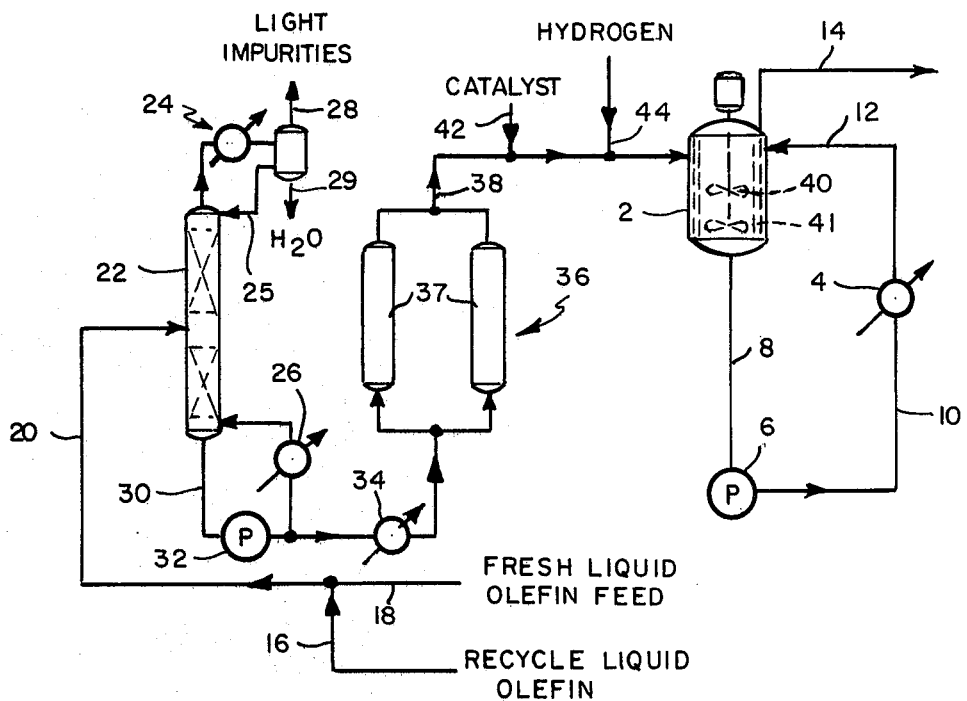
FIG. 1 is a schematic flow sheet of a method embodying the present invention.

With reference to the FIGS., 2 represents a conventional catalytic polyolefin polymerization reactor, 4 represents the pump-around cooler, 6 represents the pump which pumps the reaction mass from reactor 2 through the pump around cooler 4 and back to the reactor 2.

In conventional method of catalytically polymerizing liquid olefins under pressure to polyolefins, the effluent 14 (olefin polymer dissolved in liquid monomer) from reactor 2 is quenched with water to stop further polymerization followed by settling out the heavier water from the polymer and monomer reaction mass followed by separating the liquid monomer from the polymer by flashing it off from the polymer, and recycling the flashed liquid monomer. The separated polymer is extruded, cooled and pelletized. These subsequent operations after the reactor 2 are not shown in the drawings.

The recycled liquid olefin 16 under sufficient positive pressure to maintain it in a liquid state, is admixed with fresh liquid olefin feed 18, also under positive pressure sufficient to maintain it in a liquid state, and the mixture is passed through line 20 to a conventional stripping and drying column 22 with reflux condenser 24 and reflux boiler 26. Light volatile impurities and water (the water content of the liquid olefin is reduced to 10–20 ppm), are stripped from the liquid olefin in stripper column 22 and leave the reflux condenser at 28 and 29, respectively, with the liquid olefin being refluxed back to the stripping column. The light volatile impurities come off the top of the condenser 24 at 28 as a vapor. The condensed monomer fraction comes off the condenser as a liquid at 25 and the heavier condensed water fraction comes off as a liquid at 29.

The dried liquid olefin monomer exit 30 from the stripper 22 is pumped by pump 32 through a cooler 34 and thence through a conventional two bed molecular sieve dryer 36, where the water content of the liquid olefin is reduced to between 5–10 ppm. The flow of liquid olefin monomer is switched periodically by switching valves (not shown) from one bed 37 to the other. While the monomer is flowing through one of the beds 37 the other is regenerated by a heating element within it, which volatilizes the absorbed water. Part of the exit flow of the dried liquid monomer from the onstream bed is directed by the aforesaid switching valves through the bed being regenerated to remove the volatilized water and is subsequently recovered by a condensation operation (not shown) and blended back into the monomer recycle system. The dried monomer exiting at 38 from the molecular sieve dryer 36 flows to the reactor 2 in which it is agitated vigorously by a motorized internal agitator 40. The polymerization catalyst 42 and hydrogen 44 are injected into the liquid monomer slowly during such agitation. Polymerization of the liquid monomer proceeds with a large amount of exothermic heat of reaction. The polymer as it is formed becomes dissolved in the unreacted liquid monomer with a ratio of polymer to monomer of 10 to 40%, more preferably 15 to 25%, by weight being maintained. The reaction mass of polymer dissolved in monomer is highly viscous, i.e. about 1000 to 15000 centipoises depending on the ratio of polymer to liquid monomer. The higher this ratio the greater the viscosity. Reactor 2 is provided with conventional internal watercooled cooling plate coils 41, which also function as baffles, extending through the reactor. However, these are not adequate to remove sufficient exothermic heat to maintain the temperatures in the reactor at the proper level, about 145° F at a pressure of 450 psig for polypropylene Accordingly, to remove excess exothermic heat to maintain this temperature, the highly viscous reaction mass exiting at 8 from reactor 2 is pumped by pump 6 via lines 10 and 12 through the external tubular pump-around cooler 4 and back to the reactor 2.

Conventional pump-around coolers used in the past comprise multi-pass tubular coolers having the disadvantages referred to above.

Figure 2:
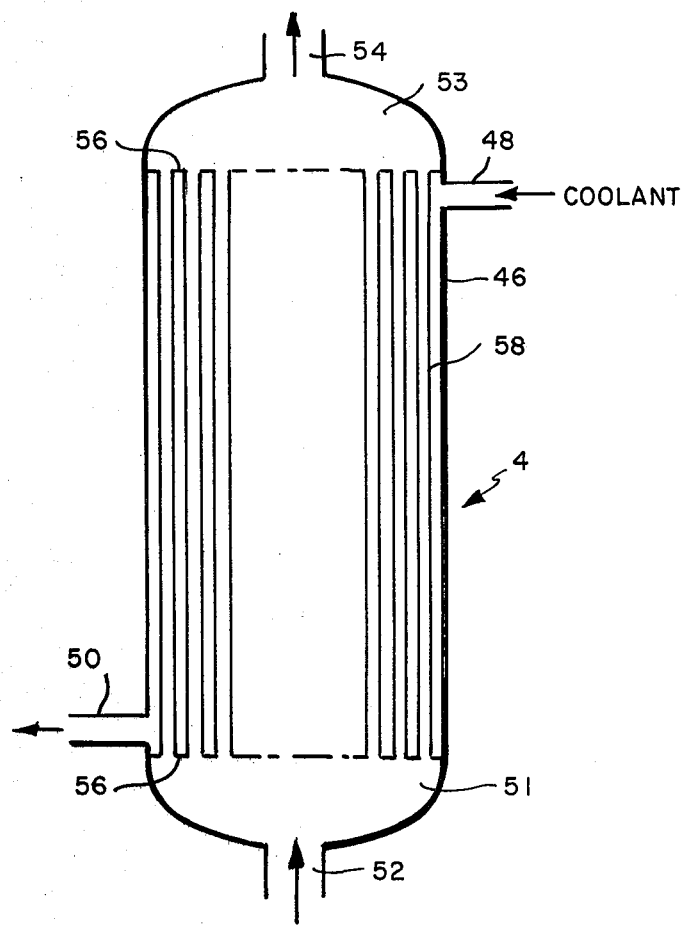
FIG. 2 is a schematic partial section in elevation of the pump-around single-pass tubular cooler of FIG. 1.
Figure 3:
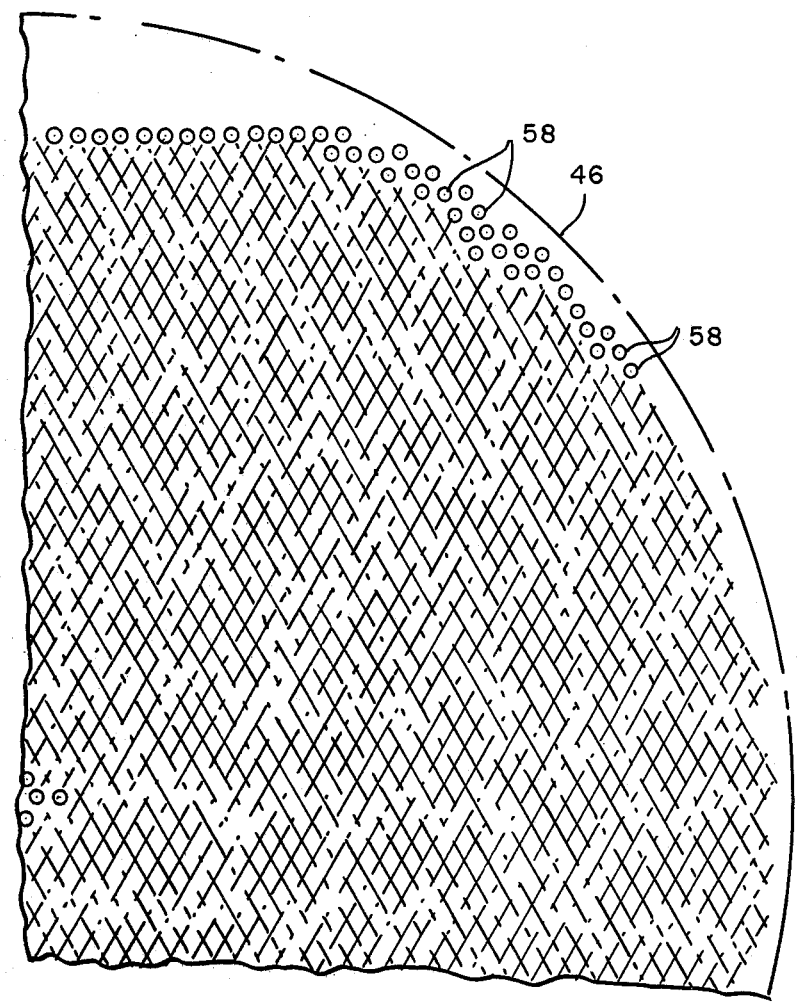
FIG. 3 is a partial section in plan of one quarter of the single pass cooler of FIG. 2.

In accordance with the invention and referring to FIGS. 2 and 3, pump-around cooler 4 comprises a vertical single-pass tubular cooler which, it has been found, eliminates or reduces these disadvantages.

The single-pass cooler comprises an outer shell 46 with entry 48 and exit 50 for the coolant, which may be water, and entry 52 and exit 54 for the reaction mass and having mounted therein by means of a pair of tube sheets 56, a bank or cluster of parallel cooling tubes 58. One end of the shell forms an entry head 51, into which the hot, pressurized reaction mass flows from entry 52 and line 10, and from which the reaction mass flows and is distributed into the entry ends of the tubes 58. The other end of the shell forms an exit head 53, into which the cooled reaction mass flows from the exit ends of the tubes 58 and thence through exit 54 to line 12 and back to the reaction 2.

The use of the single pass cooler 4, as compared to a multi-pass cooler, permits the pressure drop across the cooler to be reduced by a factor equal to the inverse of the number of passes of the multi-pass cooler. Thus, with a single-pass cooler the pressure drop is ⅓ that of a multi-pass cooler with three passes. The advantages of reducing total pressure drop have already been discussed.

Surprisingly enough, with the single-pass pump-around cooler 4, fall out of polymer on the heat transfer surfaces and head surfaces is sharply reduced or eliminated altogether and drying of the system after it has been killed with water can be achieved in 24 hours rather than the 7 to 8 days required for a three-pass cooler.

The number of tubes 58 in the single-pass cooler 4 depends primarily on the particular polyolefin being produced. It also depends on and is directly proportional to the capacity of the polyolefin plant using as a base for calculating the correct number for a plant of any particular capacity 2000 to 3000 tubes for each 15,000,000 lbs of polyolefin plant capacity.

The number of tubes 58 is substantially greater than the number of tubes used in each bank of a multi-pass cooler for the same plant capacity of the same polyolefin. In a preferred embodiment the number of tubes in the single pass cooler of the invention, as compared to such multi-pass cooler, is increased by a factor equal to about the number of passes of the multipass cooler with the same tube length. For example, if in a particular system employing a multi-pass cooler, such cooler has three passes, each having X number of tubes to achieve adequate heat transfer, the number of tubes in the single pass cooler of the invention may be about 3X for the same plant capacity and same polyolefin.

The internal diameter of the tubes 58 of the single pass cooler 4 is substantially decreased and the capacity of the pump-around pump 6 is substantially increased, as compared to a multi-pass cooler for the same plant capacity and the same polyolefin, to preferably provide a heat transfer coefficient of about 10 to 20 BTU/ft$^2$hr$^\circ$F and a velocity through the tubes of about 0.3 to 0.7 gallons per minute per tube.

The internal tube diameter of the single pass cooler 4 is preferably between ¼ and ¾ inch, more preferably between ¼ and ½, which is substantially smaller than the tubes of previously employed multi-pass coolers. This decrease in tube diameter increases the L/D factor (L represents length of the tubes and D represents internal diameter thereof) and thereby increases velocity and coefficient of heat transfer, which are lowered by increasing the number of tubes in the single pass cooler as compared to the multi-pass cooler.

With the single pass cooler of the invention, pump capacity may be raised to the maximum which is commercially available to thereby move a much larger mass of material per unit time as compared to the low pump capacity used with multi-pass coolers. The maximum pump capacity commercially available at the present time for highly viscous fluids, such as the polyolefin and olefin monomer reaction mass, is 4000 gallons per minute. The pump capacity may range from 2000 to 4000 (more preferably 3000 to 4000) and may be higher if and when pumps of higher capacity become available.

The pump capacity used with the single-pass cooler of the present invention, as compared with that used with multi-pass coolers, is preferably increased by a factor equal to the number of the multi-passes with the same tube length. For example, if in a particular system employing a multi-pass cooler having two passes, the pump capacity is 1000 gallons per minute to achieve adequate heat transfer, a pump capacity of 2000 gallons per minute may be used with the single pass cooler of the invention for the same plant capacity and the same polyolefin.

The increased pump capacity increases velocity and coefficient of heat transfer.

The length of the tubes 58 is preferably between 12 and 20 feet.

The viscosity of the reaction mass exiting at 8 from reactor 2 and pumped by pump 6 through cooler 4 and exiting from the reactor at 14 is quite high, ranging from between 1000 and 15000 centipoises depending on the ratio of polymer to monomer in the reaction mass, as aforesaid.

EXAMPLE

This example is given for a polypropylene plant having a capacity of 15,000,000 pounds of polypropylene per year.

The temperature, pressure, composition, construction and other properties of the various streams and equipment shown in FIG. 1 are set forth below with reference to the number representing the stream or element of the equipment appearing in FIG. 1.

Stream 18 — Fresh liquid propylene feed at a rate of 1880 lbs./hr. and at 70° F and 600 psig.

Stream 16 — Recycle liquid propylene recycled as described above at a ratio of recycle to fresh feed of 5 to 10 (7 is preferred) recycle to one fresh feed at a temp. of 115° F and a pressure of 600 psig and containing less than 50 ppm of polymer.

Stripper 22 — Liquid propylene monomer — stripping carried out at 170° F and 550 psig-moisture reduce to 10–20 ppm.

Cooler 34 — Entry to cooler 170° F and 560 psig. Exit from cooler 100° F and 550 psig.

Mol. Sieve — Entry and exit at 100° F — entry at 550 psig and exit at 540 psig — regeneration of off-stream dryer at 300° F and atmospheric pressure.

Catalyst 42 — Conventional Ziegler catalyst 0.5 to 1 lb catalyst per 1000 pounds of fresh monomer feed.

Hydrogen 44 — 0.05 to 0.15 lbs per 1000 pounds of fresh monomer feed to control polymer chain length.

Reactor 2 — Reactor temp. 145° F. Pressure 450 psig. Completely liquid filled. Vigorous mixing to ensure good mixing of catalyst and H$_2$ with liquid monomer. Viscosity 2100 centipoises Ratio of polymer to liquid monomer — 20%.

Stream 8 — Polypropylene dissolved in liquid propylene monomer. Viscosity 2050 centipoises Temp. 147° F. Pressure 450 psig.

Pump 6 — 4000 gallons per minute. Viscosity 2050 centipoises

Pump around Cooler 4 — Entry temp 147° F and pressure 550 psig. Exit temp. 137° F and pressure 450 psig. ΔT — 10° F. Number of tubes — 2600. Internal tube diameter ⅜ inch. Coefficient of heat transfer — 15 BTU/ft$^2$hr$^\circ$ F. Velocity — 0.6 gallons per minute per tube. Length of tubes — 15 feet. Pressure drop — 100 psig. Total heat transfer — 1660 BTU/lb. Viscosity 2900 centipoises Coolant — Water — inlet temp. 110°–115° F — outlet temp. 115°–120° F with ΔT of 5°.

Stream 14 — Polypropylene dissolved in propylene monomer at 145° F and 450 psig.

The above description and accompanying drawings of a preferred embodiment of the invention are for purposes of illustration only and it is not intended that the invention be limited thereto or thereby but only to the method claimed in the appended claims and their equivalents.

It will be understood that with other polyolefins other than polypropylene the pressures must be adjusted to make sure that the olefin monomer is maintained in a liquid state.

I claim:

1. In a method of cooling the highly viscous reaction mass of polymer dissolved in monomer during polymerization of an olefin in a reactor of a polyolefin plant by pumping by pump means the reaction mass from the reactor through the tubes of an external tubular cooler back to the reactor, the improvement comprising pumping said reaction mass through the tubes of a single pass single bank cooler as opposed to a multi-pass cooler, the internal diameter of said tubes being between ¼ and ¾ inch.

2. In a method according to claim 1, the number of said tubes being directly proportional to the capacity of said polyolefin plant based on between 2000 and 3000 tubes for a 15,000,000 lb plant capacity.

3. In a method of cooling the highly viscous reaction mass of polymer dissolved in monomer during polymerization of an olefin in a reactor of a polyolefin plant by pumping by pump means the reaction mass from the reactor through the tubes of an external tubular cooler and then back to the reactor, the improvement comprising pumping said reaction mass through the tubes of a single pass cooler, as opposed to a multi-pass cooler, to reduce fall out of polymer in the cooler surfaces during cooling and to reduce pressure drop, said single pass cooler having a sufficient number of tubes of sufficiently small diameter the internal diameter being between ¼ and ¾ inch and said pump means having a sufficient capacity to achieve a coefficient of heat transfer of about 10 to 20 BTU/ft.$^2$hr.° F.

4. In a method according to claim 3, said tube diameter being sufficiently small and the number of tubes and capacity of said pump means being sufficiently large to provide a velocity of 0.3 to 0.7 gallons per minute per tube.

5. In a method according to claim 4, the diameter of said tubes being between ¼ and ⅜ inch.

6. In a method according to claim 3, the number of said tubes being in direct proportion to the capacity of said polyolefin plant using as a base 2000 to 3000 tubes for each 15,000,000 lbs of polyolefin plant capacity.

7. In a method according to claim 6, the length of said tubes being between 12 and 20 feet.

8. In a method according to claim 4, the number of said tubes being in direct proportion to the capacity of said polyolefin plant using as a base 2000 to 3000 tubes for each 15,000,000 lbs. of polyolefin plant capacity.

9. In a method according to claim 8, the capacity of said pump means being sufficient to achieve a velocity through said tubes of between 0.3 to 0.7 gallons per minute per tube.

10. In a method according to claim 4, the length of said tubes being between 12 and 20 feet.

11. In a method of cooling the highly viscous reaction mass of polymer dissolved in monomer during polymerization of a polyolefin in a reactor by pumping by pump means the reaction mass from the reactor through the tubes of an external tubular cooler and back to the reactor, the improvement comprising pumping said reaction mass through the tubes of a single pass cooler as opposed to a multi-pass cooler to reduce fall out of polymer on the heat transfer surfaces and to reduce pressure drop, said single pass cooler having a sufficient number of tubes of sufficiently small diameter the internal diameter being between ¼ and ¾ inch and the pump means having sufficient capacity to achieve a velocity of reaction mass between about 0.3 and 0.7 gallons per minute per tube.

* * * * *

UNITED STATES PATENT AND TRADEMARK OFFICE
CERTIFICATE OF CORRECTION

PATENT NO. : 4,089,365

DATED : May 16, 1978

INVENTOR(S) : Constantine D. Miserlis, Peter J. Lewis

It is certified that error appears in the above-identified patent and that said Letters Patent are hereby corrected as shown below:

Column 3, line 51, "method" should be --methods--

Column 6, line 42, after "Mol. Sieve" should be --Dryer 36--

Claim 3, line 37 "in" should be --on--

Signed and Sealed this

Twenty-fourth Day of October 1978

[SEAL]

Attest:

RUTH C. MASON
Attesting Officer

DONALD W. BANNER
Commissioner of Patents and Trademarks